(12) United States Patent
Yeager (10) Patent No.: US 7,339,009 B2
(45) Date of Patent: Mar. 4, 2008

(54) CROSS-LINKED POLYIMIDE AND METHOD OF MAKING THEM

(75) Inventor: Gary William Yeager, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 399 days.

(21) Appl. No.: 11/014,138

(22) Filed: Dec. 16, 2004

(65) Prior Publication Data

US 2006/0135732 A1 Jun. 22, 2006

(51) Int. Cl.
*C08L 79/08* (2006.01)

(52) U.S. Cl. ............ 525/427; 525/423; 525/430; 525/436; 525/432

(58) Field of Classification Search ......... 525/427, 525/423, 430, 436, 432
See application file for complete search history.

(56) References Cited

U.S. PATENT DOCUMENTS

| | | | |
|---|---|---|---|
| 3,442,861 A * | 5/1969 | Hoegger | ............ 525/427 |
| 3,925,211 A | 12/1975 | Schumann et al. | |
| 4,071,590 A | 1/1978 | Strathmann | |
| 4,100,140 A * | 7/1978 | Zahir et al. | ............ 526/90 |
| 4,474,662 A | 10/1984 | Makino et al. | |
| 4,717,393 A | 1/1988 | Hayes | |
| 4,959,151 A | 9/1990 | Nakatani et al. | |
| 4,978,573 A | 12/1990 | Kohn | |
| 4,981,497 A | 1/1991 | Hayes | |
| 5,248,760 A * | 9/1993 | DuBois et al. | ............ 528/353 |
| 6,660,062 B2 | 12/2003 | Liu et al. | |

FOREIGN PATENT DOCUMENTS

| | | | |
|---|---|---|---|
| JP | 60-245672 | * | 12/1985 |
| WO | 091313 | | 11/2003 |

\* cited by examiner

*Primary Examiner*—Ana Woodward
(74) *Attorney, Agent, or Firm*—Shawn A. McClintic; William E. Powell, III (57) ABSTRACT

A cross-linked polyimide is disclosed. The cross-linked polyimide includes a polyimide and at least one oxygenated hydrocarbon. The oxygenated hydrocarbon cross-links the polyimide. A porous cross-linked membrane is also disclosed. The porous cross-linked membrane includes a support structure and a cross-linked polyimide disposed on the support structure. The cross-linked polyimide includes a polyimide; and at least one oxygenated hydrocarbon cross-linking the polyimide. Also disclosed are methods of making the cross-linked polyimide and the porous cross-linked membrane.

18 Claims, 6 Drawing Sheets

CROSS-LINKED POLYIMIDE AND METHOD OF MAKING THEM

BACKGROUND OF THE INVENTION

The invention relates to polyimides and membranes comprising polyimides. Particularly, the invention is directed to cross-linked polyimides with at least one oxygenated hydrocarbon cross-linking the polyimide and membranes comprising cross-linked polyimides.

DESCRIPTION OF RELATED ART

It is known to produce solvent resistant membranes by treating a porous polysulfone membrane with paraformaldehyde and sulfuric acid. It is also known to produce cross-linked polysulfones by treating polysulfones with aldehydes (including paraformaldehyde), ketones, and $H_2SO_4$.

However, a need still remains for cross-linked polyimides with oxygenated hydrocarbons. Also still needed are membranes comprising porous cross-linked polyimides with oxygenated hydrocarbons.

SUMMARY

The purpose and advantages of embodiments of the invention will be set forth and apparent from the description that follows, as well as will be learned by practice of the embodiments of the invention. Additional advantages will be realized and attained by the methods and systems particularly pointed out in the written description and claims hereof, as well as from the appended drawings.

An embodiment of the invention provides a cross-linked polyimide. The cross-linked polyimide comprises: a polyimide and at least one oxygenated hydrocarbon cross-linking the polyimide.

Another embodiment provides a method of making a cross-linked polyimide. The cross-linked polyimide comprises: a polyimide and at least one oxygenated hydrocarbon cross-linking the polyimide. The method comprises: providing a polyimide and an oxygenated hydrocarbon cross-linking the polyimide.

Another embodiment provides a porous cross-linked membrane. The porous cross-linked membrane comprises: a support structure; and a cross-linked polyimide disposed on the support structure. The cross-linked polyimide comprises: a polyimide; and at least one oxygenated hydrocarbon cross-linking the polyimide.

Another embodiment provides a method a method of making a porous cross-linked membrane. The porous cross-linked membrane comprises: a support structure and a cross-linked polyimide disposed on the support structure. The cross-linked polyimide comprises: a polyimide; and at least one oxygenated hydrocarbon cross-linking the polyimide. The method comprises: disposing a solution comprising a polyimide and a solvent onto a support structure; providing an oxygenated hydrocarbon to the solution or support structure, wherein the oxygenated hydrocarbon cross-links the polyimide; and at least partially removing the solvent to form a porous membrane comprising an oxygenated hydrocarbon.

The accompanying figures, which are incorporated in and constitute part of this specification, are included to illustrate and provide a further understanding of the method and system of the invention. Together with the description, the drawings serve to explain the principles of the invention.

DETAILED DESCRIPTION OF EXEMPLARY EMBODIMENTS

Reference will now be made in detail to exemplary embodiments of the invention, which are illustrated in the accompanying figures and examples. Referring to the drawings in general, it will be understood that the illustrations are for the purpose of describing a particular embodiment of the invention and are not intended to limit the invention thereto.

Whenever a particular embodiment of the invention is said to comprise or consist of at least one element of a group and combinations thereof, it is understood that the embodiment may comprise or consist of any of the elements of the group, either individually or in combination with any of the other elements of that group. Furthermore, when any variable occurs more than one time in any constituent or in formula, its definition on each occurrence is independent of its definition at every other occurrence. Also, combinations of substituents and/or variables are permissible only if such combinations result in stable compounds.

Figure 1:
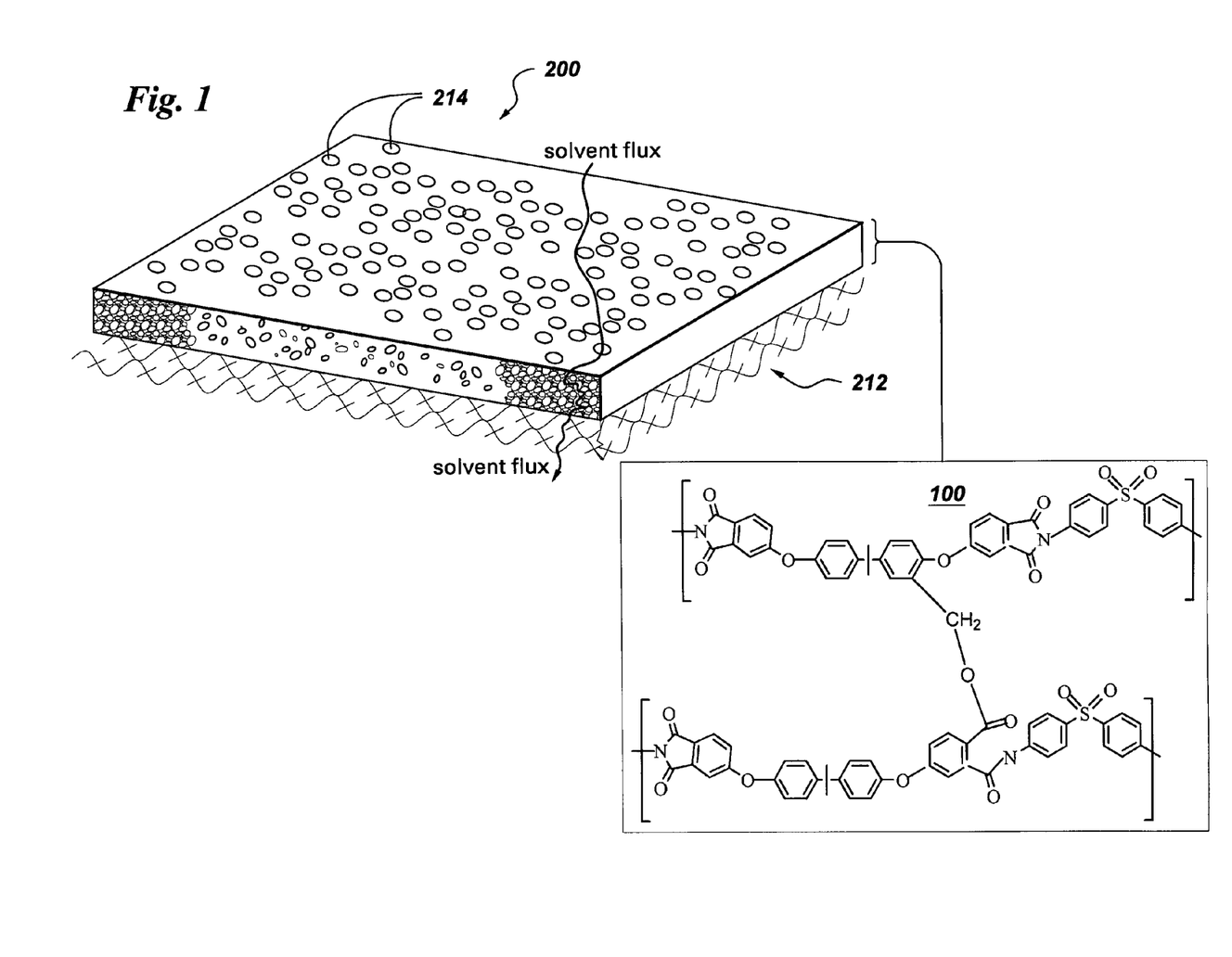
FIG. 1 is a schematic representation of a porous cross-linked membrane in accordance with an embodiment of the invention.

With reference to FIG. 1, one embodiment of a cross-linked polyimide 100, for illustration and not limitation, is depicted. The cross-linked polyimide 100 comprises: a polyimide 112; and at least one oxygenated hydrocarbon 114. The oxygenated hydrocarbon 114 cross-links the polyimide 112.

Examples of polyimides 112 include, but are not limited to, polyimides 100 prepared by condensation of a diamine and a tetracarboxylic acid or acid anhydride. The condensation may be carried out as known in the art.

Examples of diamines include, but are not limited to, bis(aminophenoxy)benzene compounds, bis(aminophenyl)benzene compounds, diaminodiphenylether compounds, diaminodiphenyl thioether compounds, diaminodiphenyl sulfone compounds, diaminodiphenylalkane compounds, diaminobiphenyl compounds, diaminodibenzothiophene compounds, and diaminothioxanthene compounds.

Examples of diames that are bis(aminophenoxy)benzene compounds include 1,4-bis(4-aminophenoxy)benzene, 1,4-bis(3-aminophenoxy)benzene and 1,3-bis(4-aminophenoxy)benzene.

Examples of diames that are diaminodiphenylether compounds include 4,4'-diaminodiphenylether and 3,4'-diaminodiphenylether; diaminodiphenylmethane compounds, such as 4,4'-diaminodiphenylmethane and 3,4'-diaminodiphenylmethane; diaminodiphenylpropane compounds such as 4,4'-diamino-(2,2-diphenylpropane) and 3,4'-diamino-(2,2-diphenylpropane); diaminodiphenylsulfone compounds such as 4,4'-diaminodiphenylsulfone and 3,3'-diaminodiphenylsulfone; and diaminobiphenyl compounds such as 3,3'-dimethoxy benzidine.

Examples of diames that are diaminodibenzothiophene compounds, include, but are not limited to, 3,7-diaminodibenzothiophene, 3,7-diaminodibenzothiophene-5,5-dioxide, 2,8-dimethyl-3,7diaminodibenzothiophene, 2,6-dimethyl-3,7-diaminodibenzothiophene, 4,6-dimethyl-3,7-diaminodibenzothiophene, 2,8-dimethyl-3,7-diaminodibenzothiophene-5,5-dioxide, 2,6-dimethyl-3,7-diaminodibenzothiophene-5,5-dioxide, 4,6-dimethyl-3,7-diaminodibenzothiophene-5,5-dioxide, 2,8-diethyl-3,7-diaminodibenzothiophene, 2,6-diethyl-3,7-diaminodibenzothiophene, 4,6-diethyl-3,7-diaminodibenzothiophene, 2,8-diethyl-3,7-diaminodibenzothiophene-5,5-dioxide, 2,6-diethyl-3,7-diaminodibenzothiophene-5,5-dioxide, and 4,6-diethyl-3,7-diaminodibenzothiophene-5,5-dioxide.

Examples of diames that are diaminothioxanthene compounds include, but are not limited to, 3,7-diaminothioxanthene, 3,7-diaminothioxanthene-5,5-dioxide, 2,8-dimethyl-3,7-diaminothioxanthene, 2,6-dimethyl-3,7-diaminothioxanthene, 4,6-dimethyl-3,7-diaminothioxanthene, 2,8-dimethyl-3,7-diaminothioxanthene-5,5-dioxide, 2,6-dimethyl-3,7-diaminothioxanthene-5,5-dioxide, and 4,6-dimethyl-3,7-diaminothioxanthene-5,5-dioxide.

Examples of diames that are diaminodiphenylalkane compounds, include, but are not limited to, diaminodiphenylmethane compounds, for example, 4,4'-diaminodiphenylmethane, 3,4'-diaminodiphenylmethane and 3,3'-dimethyl-4,4'-diaminodiphenylmethane; and diamino-2,2-bis(phenyl)propane compounds, for example, 2,2-bis(4-aminophenyl)propane, 2,2-bis(3-aminophenyl)propane and 3,4'-diamino-(2,2-diphenyl)propane.

Other amines include, but are not limited to, m-phenylenediamine and p-phenylenediamine; diaminobenzoic acid compounds such as 2,4-diaminobenzoic acid, 3,5-diaminobenzoic acid, 3,6-diaminobenzoic acid, methyl 2,4-diaminobenzoate; methyl 3,5-diaminobenzoate; diaminopyridine compounds such as 2,6-diaminopyridine and 3,5-diaminopyridine; alkylated phenylenediamine compounds such as 2-methyl-p-phenylenediamine, 4-methyl-m-phenylene-diamine, 2,5-dimethyl-p-phenylenediamine and 2,5-diethyl-p-phenylenediamine, in which the alkyl groups have 1 to 5 carbon atoms; and alkoxylated phenylenediamine compounds such as 2-methoxy-p-phenylenediamine, and 4-methoxy-m-phenylenediamine. Also included are 9,10-bis(4-aminophenyl)anthracene, 9,10-bis(3-aminophenyl)anthracene and 9-(4-aminophenyl)-10-(3-aminophenyl)anthracene.

Examples of diames that are di(aminophenoxy)diphenylsulfone compounds include, but are not limited to, 4,4'-bis(4-aminophenoxy)diphenylsulfone, 4,4'-bis(3-aminophenoxy)diphenylsulfone and 3,4'-di(4-aminophenoxy)diphenylsulfone.

Examples of diames that are di(aminophenoxy)biphenyl include, but are not limited to, 4,4'-di(4-aminophenoxy)biphenyl, 4,4'-di(3-aminophenoxy)biphenyl, 3,4'-di(4-aminophenoxy)biphenyl, and 3,4'-di(3-aminophenoxy)biphenyl.

Examples of diames that are di(aminophenoxy)diphenylalkane compounds include, but are not limited to, 4,4'-di(4-aminophenoxy)diphenylmethane, 4 4'-di(3-aminophenoxy)diphenylmethane, 2,2-bis[4-(4-amino-phenox)phenyl]propane, 2,2-bis[4-(3-aminophenoxy)phenyl] propane, 2,2-bis[4-(4-aminophenoxy)phenyl] perfluoropropane, and 2,2-bis[4-(3-aminophenoxy)phenyl] perfluoropropane.

The aromatic tetracarboxylic acid or acid anhydride compounds include, but are not limited to, 2,3,3',4'-biphenyltetracarboxylic acid, 3,3',4,4'-biphenyltetracarboxylic acid, 3,3',4,4'-diphenylether tetracarboxylic acid, and dianhydrides, lower alkyl esters, preferably having 1 to 3 atoms and salts of the above-mentioned acids, particularly 3,3',4,4'-biphenyltetracarboxylic dianhydride and 3,3',4,4'-diphenylethertetracarboxylic dianhydride, pyromellitic acid, 2,2-bis(3,4-dicarboxyphenyl)propane, bis(3,4-dicarboxyphenyl)methane, 3,3',4,4'-benzophenonetetracarboxylic acid, and dianhydrides, lower alkyl esters, particularly having 1 to 3 carbon atoms, and salts of the above-mentioned acids.

Other examples of aromatic tetracarboxylic acid or acid anhydride include, but are not limited to, 1,3-bis(2,3-dicarboxyphenoxy)benzene dianhydride; 1,3-bis(3,4-dicarboxyphenoxy)benzene dianhydride; 1,4-bis(2,3-dicarboxyphenoxy)benzene dianhydride; 1,4-bis(3,4-dicarboxyphenoxy)benzene dianhydride; 2,2-bis[4-(2,3-dicarboxyphenoxy)phenyl]propane dianhydride;-2,2-bis[4-(3,4-dicarboxyphenoxy)phenyl]propane dianhydride; 4,4'-bis(2,3-dicarboxyphenoxy)diphenyl sulfide dianhydride; 4,4'-bis(3,4-dicarboxyphenoxy)diphenyl sulfide dianhydride; 4,4'-bis(2,3dicarboxyphenoxy)diphenyl ether dianhydride; and 4,4'-bis(3,4-dicarboxyphenoxy)diphenyl ether dianhydride.

In one embodiment, the polyimide 112 comprises a repeat unit comprising:

wherein the repeat unit comprises a finite number of repeat units. R is independently at each occurrence a substituted or unsubstituted alkyl, or a substituted or unsubstituted aryl. m is a finite number in a range from about 1 to about 1000. The alkyl or aryl may be substituted with, but is not limited to, an alkly, aryl, oxygen, nitrogen, fluorine, silicon, phosphorus, sulfur, chlorine, bromine, iodine, silicate, phosphonate, phosphine oxide, carbinol, carboxyl, aldehyde, amine, nitro, azo, sulfoxide, and sulfone. In one embodiment, m is a finite number in a range from about 1 to about 500. In another embodiment, m is a finite number in a range from about 1 to about 3. In yet another embodiment, m is 1.

In another embodiment, the polyimide 112 comprises a polyether imide. In a particular embodiment, the polyether imide comprises a repeat unit comprising:

wherein the repeat unit comprises a finite number of repeat units.

The cross-linked polyimide 100 may also include a plurality of polyimides 112. It should be appreciated that the plurality of polyimides 112 may be of the same or different kind of polyimides 112, as described hereinabove.

In one embodiment, the cross-linked polyimide 100 comprises a plurality of oxygenated hydrocarbons 114. In one embodiment, the oxygenated hydrocarbon 114 either individually comprises at least one of formals, ethers, acetals, ketals, orthoformates, thioorthoformate, ketones, aldehydes, epoxides or in any combination thereof. In a particular embodiment, the oxygenated hydrocarbon 114 either individually comprises at least one of formaldehyde, methylal, dioxolane, trioxane, tetraoxane, paraformaldehyde, trioxane, tetraoxane, dialkoxymethane, diacyloxymethane, 1,3-dioxane, 1,3-dithiane, 1,3-oxathianeacetaldehyde, propionaldehyde, butylaldehyde, iso-butylaldehyde, valeraldehyde, laurinaldehyde, stearinaldehyde, glyoxal, succindialdehyde, acrolein, crotonaldehyde, propiolaldehyde, benzaldehyde, tolylaldehyde, salicylaldehyde, cinnamaldehyde, naphthaldehyde, furfural, and glycidyl ether or in any combination thereof. In yet another particular embodiment, the oxygenated hydrocarbon 114 either individually comprises at least one of paraformaldehyde, formaldehyde, dioxolane, and trioxane or in any combination thereof.

The cross-linked polyimide 100 may comprise a single or a plurality of cross-linked polyimides 100. It should be appreciated that each of the cross-linked polyimides 100 may be cross-linked by different kinds of oxygenated hydrocarbons 114 as described hereinabove. Also, a plurality of oxygenated hydrocarbons 114 may cross-link a polyimide 112 at a plurality of sites. An example of a cross-linked polyimide 100 includes, but is not limited to, wherein the repeat unit comprises a finite number of repeat units. It should also be appreciated that an oxygenated hydrocarbon 114 may cross-link a polyimide 112 at different locations on the oxygenated hydrocarbons 114 and on different locations on the polyimide 112 to produce the cross-linked polyimide 112. Furthermore, the cross-linked polyimide 100 may also be sulfonated or hydroxyalkylated.

Next will be described a method of making a cross-linked polyimide 100, as described hereinabove. The method comprises: providing a polyimide 112 and an oxygenated hydrocarbon 114 cross-linking the polyimide 112.

A schematic representation of the method is illustrated below.

electrodialysis, thermo-osmosis, and membrane distillation. The details of these processes, such as temperatures and pressures, as known in the art.

Figure 2:
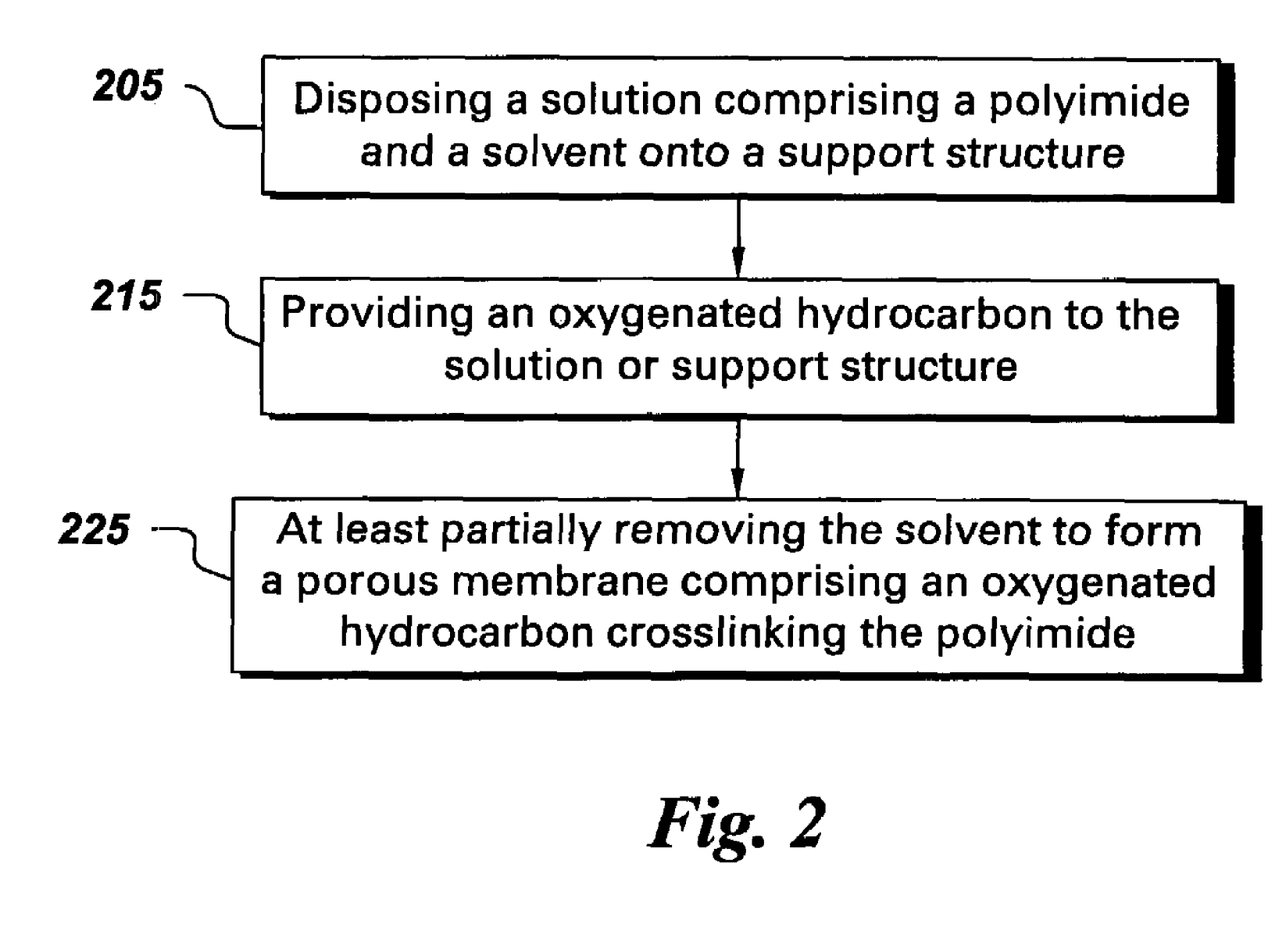
FIG. 2 is a flow chart of a method of making a porous cross-linked membrane in accordance with an embodiment of the invention.
Figure 3A:
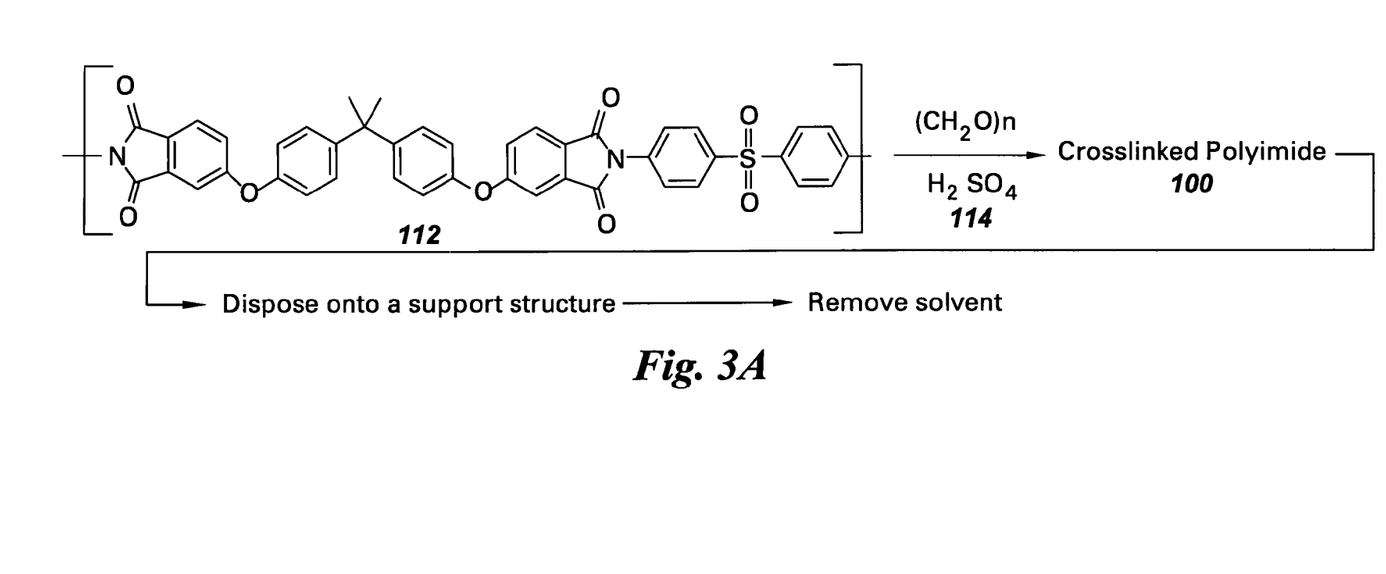
FIG. 3a is a schematic representation of a method of making a porous cross-linked membrane in accordance with an embodiment of the invention.
Figure 3B:
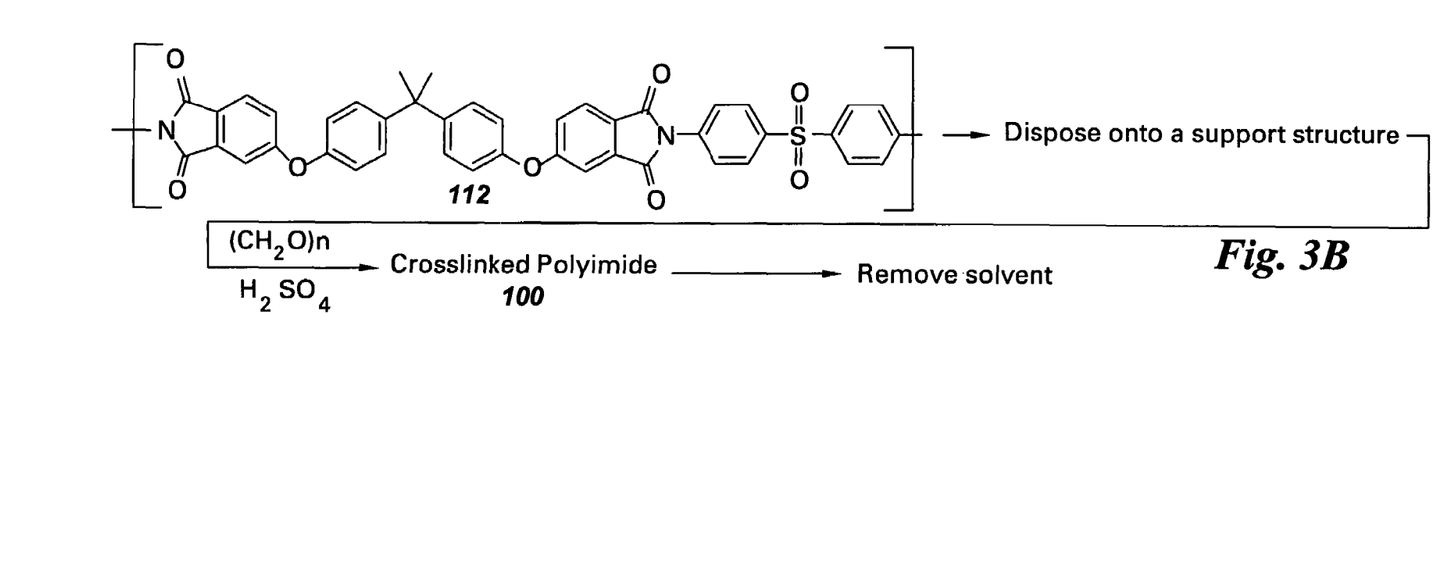
FIG. 3b is another schematic representation of a method of making a porous cross-linked membrane in accordance with an embodiment of the invention.
Figure 3C:
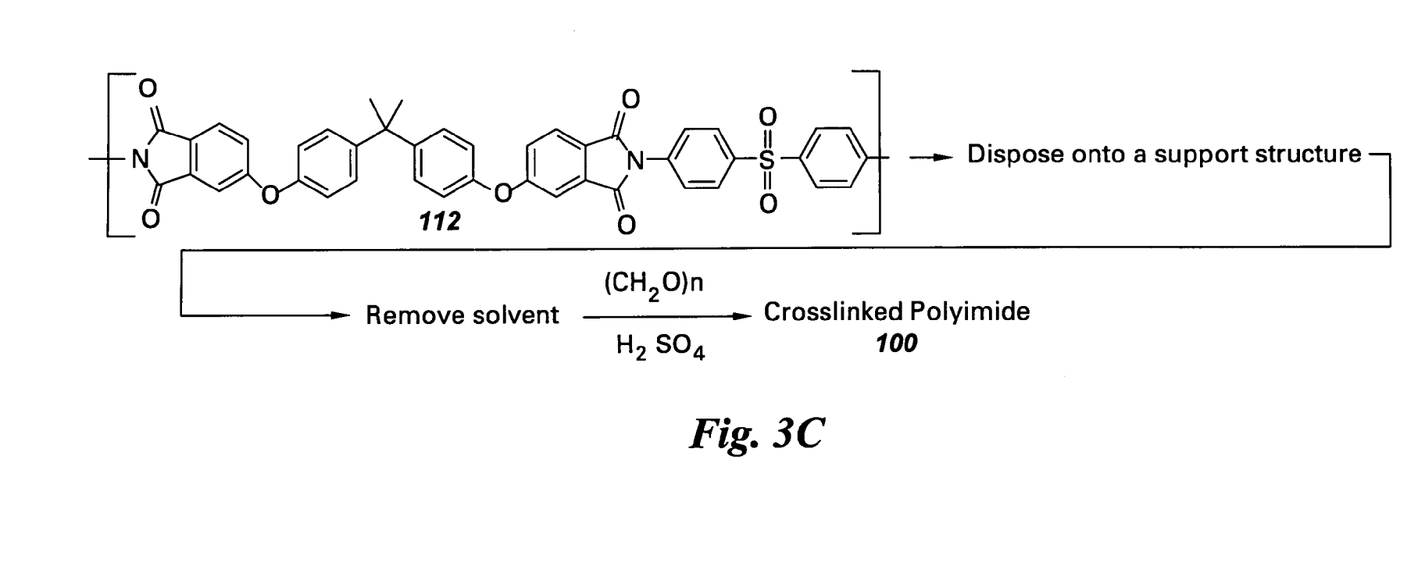
FIG. 3c is another schematic representation of a method of making a porous cross-linked membrane in accordance with an embodiment of the invention.

With reference to FIG. 2 and FIG. 3a-3c, next will be described a method of making a porous cross-linked membrane 200. FIG. 2 is a flow chart of a method of making a porous cross-linked membrane 200. FIG. 3a-3c are schematic representation of methods of making a porous cross-linked membrane 200. The method comprises at Step 205 disposing a solution comprising a polyimide 112 and a solvent onto a support structure 212. The polyimide 112 includes any polyimide 112 as discussed hereinabove.

In one embodiment, the oxygenated hydrocarbon 114 is provided under the presence of a catalyst. In a particular embodiment, the catalyst comprises an acid. The acid includes any Lewis or Bronstead acid, particularly with a pKa<2. In one embodiment, the acid comprises at least one acid selected from a group consisting of sulfuric acid, phosphoric acid and sulfonic acid, such as alkylsulfonic acid, and aryl sulfonic acid.

The cross-linked polyimide 100 may have various applications, such as, but not limited to, membrane technology. Consequently, with reference to FIG. 1, a porous cross-linked membrane 200 is described. The porous cross-linked membrane 200 comprises a support structure 212; and a cross-linked polyimide 100 disposed on the support structure 212. The cross-linked polyimide 100 comprises a polyimide 112 and at least one oxygenated hydrocarbon 114 cross-linking the polyimide 112, as described hereinabove.

The support structure 212 provides mechanical stability. An example of a support structure 212 includes a glass plate. The support structure 212 may comprise various other fibrous materials such as fibrous reinforcements. Examples of fibrous reinforcements include, but are not limited to, polyester, polyphenylene sulfide, polyaramide, polytetrafluoroethylene, polypropylene, and fibrous glass. The support structure 212 may be of any shape and size, such as depth, width, length, or other dimension. In one embodiment, the support structure 212 comprises a non-woven fibrous support structure 212.

In one embodiment, the porous cross-linked membrane 200 comprises pores 214 with an average size in the range from about 1 nm to about 10,000 nm. The membrane 200 may be symmetric, where the sizes of the pores 214 are similar across a gradient, or asymmetric, where the sizes of the pores 214 vary across a gradient.

The porous cross-linked membrane 200 can be used in various applications such as microfiltration, ultrafiltration, nanofiltration, reverse osmosis, piezodialysis, gas separations, pervaporation, dialysis, osmosis, liquid membranes, In one embodiment, the solvent comprises a polar aprotic solvent. Examples of polar aprotic solvents include, but are not limited to, N,N-dimethylformamide, N,N-dimethylacetamide, N-methylpyrollidinone), ethers such as THF and chlorinated hydrocarbons such as methylene chloride, chloroform 1,1,2-trichloroethane. Any of the aforementioned solvents may be used either individually or in combination with each other, providing that they are miscible.

Step 215 includes providing an oxygenated hydrocarbon 114 to the solution or support structure, wherein the oxygenated hydrocarbon cross-links the polyimide 112.

Step 225 includes at least partially removing the solvent to form a porous membrane. At least partially removing the solvent forms the pores 214, which is also referred to as phase inversion. In one embodiment, the solvent may be at least partially removed by providing anti-solvents. Examples of anti-solvents include, but are not limited to, water, alcohols such as methanol, ethanol, isopropanol, and ketones such as acetone, methylethylketone, isobutyl ketone.

Examples of phase inversion processes include but are not limited to the following: 1) vapor-induced phase separation (VIPS), also called "dry casting" or "air casting"; 2) liquid-induced phase separation (LIPS), mostly referred to as "immersion casting" or "wet casting"; and 3) thermally induced phase separation (TIPS), frequently called "melt casting". The phase inversion process can also lead to integrally skinned asymmetric membranes 200, which is an asymmetric membrane in which the uppermost layer of the membrane 200 is non-porous. Both the solvent and anti-solvent may be used as binary or ternary systems by combination with other solvents, anti-solvents or additives, including drying agents known to the art or polymers (e.g. polyvinylpyrollidinone) which affect morphology of the phase inverted membrane.

As shown in FIG. 3a-3c the method is not limited by when the oxygenated hydrocarbon 114 is provided. Not being limited by when the oxygenated hydrocarbon 114 is provided also means that the method is not limited by when the polyimide 112 is cross-linked because the oxygenated hydrocarbon 114 cross-links the polyimide 112. In one embodiment as in FIG. 3*a*, the oxygenated hydrocarbon is either sequentially or simultaneously added to the solvent before the solution is disposed on the support structure 212. In another embodiment as in FIG. 3*b*, the oxygenated hydrocarbon 114 is provided after the solution is disposed on the support structure 212 but before the solvent is removed. In yet another embodiment as in FIG. 3*c*, the oxygenated hydrocarbon 114 is provided after the solvent is removed. In fact, the oxygenated hydrocarbon 114 can be provided at any or all of the times discussed above.

Since the oxygenated hydrocarbon 114 can be provided before or after the solvent is removed, this also means that the cross-linking of the polyimide 112 may occur just after the polyimide 112 has been phase inverted (i.e. formed pores 214) or during or before the phase inversion process. The cross-linking of the polyimide 112 may occur after the pores 214 have formed if the oxygenated hydrocarbon 114 is provided after the solvent is removed. The cross-linking of the polyimide 112 may occur before the pores 214 have formed if the oxygenated hydrocarbon 114 is provided before the solvent is removed.

The temperature of the solution when cross-linking may be varied depending upon desired properties of the membrane 200, such as resistance to a liquid. In one example, the temperature may be kept in a range from about 0° C. to about 60° C. and particularly from about 25° C. to about 30° C. The membrane 200 may be washed free from any strongly acidic solution with a non-acidic solution such as deionized water.

The polyimides 112 may be fabricated into symmetric configurations, where the sizes of the pores 214 are similar across a gradient, or asymmetric configurations where the sizes of the pores vary across a gradient. Asymmetric membranes may be prepared by solution coating, interfacial polymerization, plasma polymerization or sol-gel methods.

It should be appreciated that the method of forming membranes include other methods known to the art, such as film stretching, template leaching, nucleation track etching, sintering, solution casting or extrusion.

EXAMPLE 1

Preparation of a Porous Cross-Linked Polyimide Membrane 200.

Figure 4:
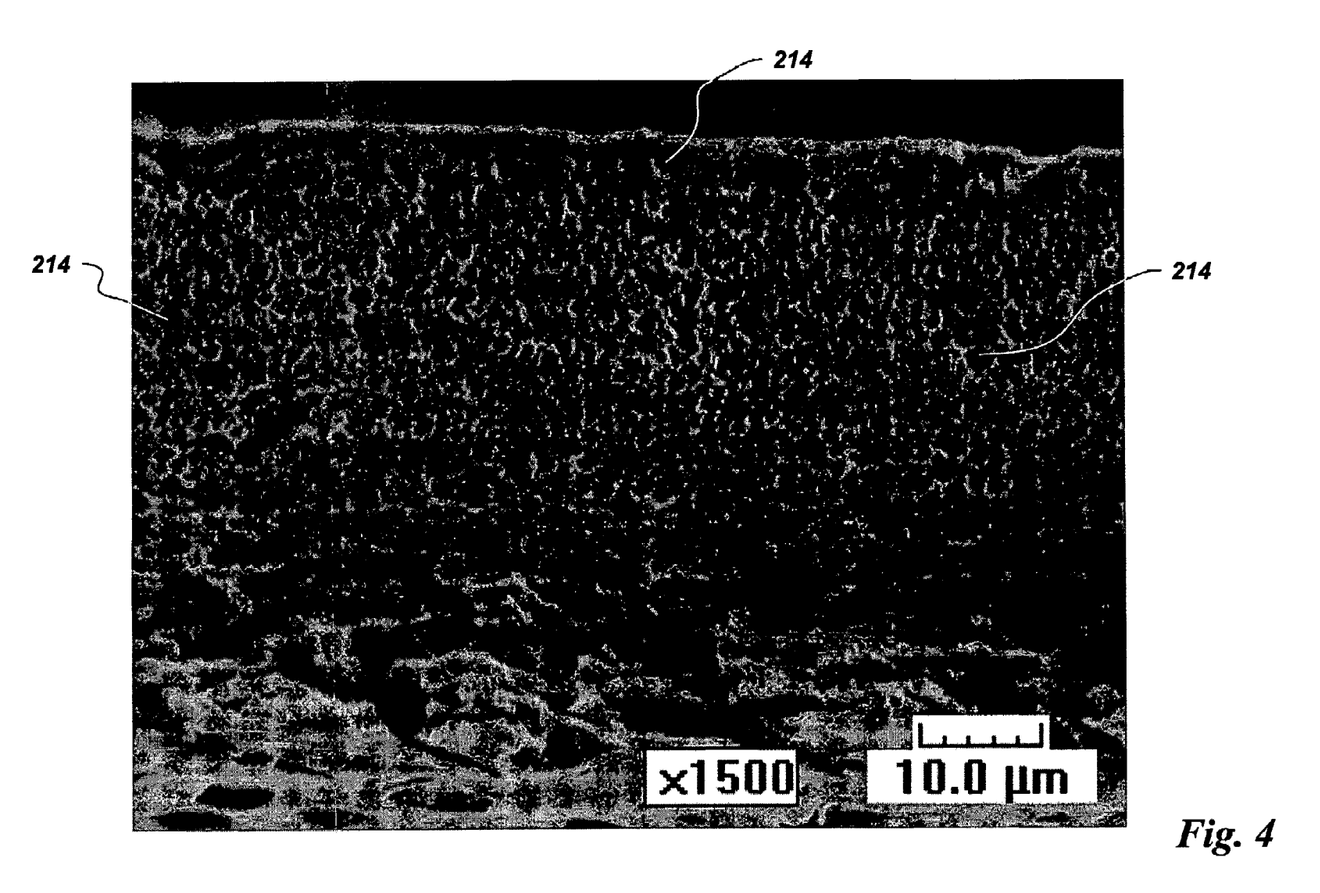
FIG. 4 is a scanning electronic microscopic (SEM) image of a porous cross-linked membrane in accordance with an embodiment of the invention.

A polyimide (112) copolymer of bisphenol-A dianhydride and 4-4'diaminodiphenylsulfone (30 g) was dissolved in a solvent to form a solution. The solvent was 70 g of N,N'-dimethylformamide. A thin wet film of the solution was disposed on a support structure 212 using a Myer rod. The support structure 212 was a glass plate. Some of the solvent was removed from the wet film. The solvent was removed by quenching in an anti-solvent, such as a solution of deionized water. Removing some of the solvent produced a porous polyimide membrane, which was air-dried. The porous polyimide membrane was treated with a solution comprising 30 g paraformaldehdye and 100 g sulfuric acid to cross-link the polyimide 112 and form a cross-linked polyimide membrane 200. After such time, the porous cross-linked polyimide membrane 200 was washed extensively with deionized water to remove any highly acidic material. A scanning electron micrograph of the porous cross-linked polyimide membrane 200 is shown in FIG. 4.

EXAMPLE 2

The cross-linked polyimide membrane 200 from Example 1 was immersed in a solution of DMF. As a control, a porous polyimide membrane, which was not cross-linked, was also immersed in a solution of DMF. The control membrane was virtually similar to Example 1, except without the last cross-linking step of treating with a solution comprising 30 g paraformaldehdye and 100 g sulfuric acid.

In less than 1 minute, the control membrane without cross-linking completely dissolved, whereas the cross-linked polyimide membrane 200 of Example 1 showed no visible signs of degradation. This indicates that cross-linking the polyimide with the paraformaldehyde solution improved the solvent resistance of the polyimide.

While the invention has been described in detail in connection with only a limited number of aspects, it should be readily understood that the invention is not limited to such disclosed aspects. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A cross-linked polyimide comprising:
   a polyimide; and
   at least one oxygenated hydrocarbon cross-linking the polyimide, wherein the oxygenated hydrocarbon has an oxygen moiety
   wherein the polyimide comprises a polyether imide, and
   wherein the polyether imide comprises a repeat unit comprising:

wherein the repeat unit comprises a finite number of repeat units.

2. The cross-linked polyimide of claim 1, wherein the polyimide further comprises a repeat unit comprising:

wherein R is independently at each occurrence an alkyl group, or an aryl group; and wherein the repeat unit comprises a finite number of repeat units, and "m" is a finite number in a range from about 1 to about 1000.

3. The cross-linked polyimide of claim 1, wherein the oxygenated hydrocarbon comprises at least one oxygenated hydrocarbon selected from the group consisting of formals, ethers, acetals, ketals, orthoformates, thioorthoformate, ketones, aldehydes, and epoxides.

4. The cross-linked polyimide of claim 3, wherein the oxygenated hydrocarbon comprises at least one oxygenated hydrocarbon selected from the group consisting formaldehyde, methylal, dioxolane, trioxane, tetraoxane, paraformaldehyde, trioxane, tetraoxane, dialkoxymethane, diacyloxymethane, 1,3-dioxane, 1,3-dithiane, 1,3-oxathianeacetaldehyde, propionaldehyde, butylaldehyde, iso-butylaldehyde, valeraldehyde, laurinaldehyde, stearinaldehyde, glyoxal, succindialdehyde, acrolein, crotonaldehyde, propiolaldehyde, benzaldehyde, tolylaldehyde, salicylaldehyde, cinnamaldehyde, naphthaldehyde, furfural, and glycidyl ether.

5. The cross-linked polyimide of claim 4, wherein the oxygenated hydrocarbon comprises at least one oxygenated hydrocarbon selected from the group consisting of paraformaldehyde, formaldehyde, dioxolane, and trioxane.

6. The cross-linked polyimide of claim 1, wherein the oxygenated hydrocarbon comprises a plurality of oxygenated hydrocarbons.

7. The cross-linked polyimide of claim 6, wherein the plurality of oxygenated hydrocarbons cross-link the polyimide at a plurality of sites.

8. A method of making a cross-linked polyimide comprising:

providing a polyimide and providing an oxygenated hydrocarbon for cross-linking the polyimide, wherein the oxygenated hydrocarbon has an oxygen moiety, wherein the polyimide comprises a polyether imide, and wherein the polyether imide comprises a repeat unit comprising:

wherein the repeat unit comprises a finite number of repeat units.

9. The method of claim 8, wherein the polyimide further comprises a repeat unit comprising:

wherein R is independently at each occurrence an alkyl group, or an aryl group; and wherein the repeat unit comprises a finite number of repeat units, and "m" is a finite number in a range from about 1 to about 1000.

10. The method of claim 8, wherein providing the oxygenated hydrocarbon occurs under the presence of a catalyst.

11. The method of claim 10, wherein the catalyst comprises an acid.

12. The method of claim 11, wherein the acid comprises at least one acid selected from the group consisting of sulfuric, phosphoric, sulfonic acid, and boron trifluoride.

13. The method of claim 12, wherein the acid comprises sulfuric acid.

14. The method of claim 8, wherein the oxygenated hydrocarbon comprises at least one oxygenated hydrocarbon selected from the group consisting of formals, ethers, acetals, ketals, orthoformates, thioorthoformate, ketones, aldehydes, and epoxides.

15. The method of claim 14, wherein the oxygenated hydrocarbon comprises at least one oxygenated hydrocarbon selected from the group consisting formaldehyde, methylal, dioxolane, trioxane, tetraoxane, paraformaldehyde, trioxane, tetraoxane, dialkoxymethane, diacyloxymethane, 1,3-dioxane, 1,3-dithiane, 1,3-oxathianeacetaldehyde, propionaldehyde, butylaldehyde, iso-butylaldehyde, valeraldehyde, laurinaldehyde, stearinaldehyde, glyoxal, succindialdehyde, acrolein, crotonaldehyde, propiolaldehyde, benzaldehyde, tolylaldehyde, salicylaldehyde, cinnamaldehyde, naphthaldehyde, furfural, and glycidyl ether.

16. The method of claim 15, wherein the oxygenated hydrocarbon comprises at least one oxygenated hydrocarbon selected from the group consisting of paraformaldehyde, formaldehyde, dioxolane, and trioxane.

17. The method of claim 8, wherein the oxygenated hydrocarbon comprises a plurality of oxygenated hydrocarbons.

18. The method of claim 17, wherein the plurality of oxygenated hydrocarbons cross-link the polyimide at a plurality of sites.

* * * * *

UNITED STATES PATENT AND TRADEMARK OFFICE
CERTIFICATE OF CORRECTION

PATENT NO. : 7,339,009 B2
APPLICATION NO. : 11/014138
DATED : March 4, 2008
INVENTOR(S) : Gary William Yeager It is certified that error appears in the above-identified patent and that said Letters Patent is hereby corrected as shown below:

Col. 11, claim 2, line 17 [["in"]] should be -- m --

Col. 11, claim 4, line 26 [[group consisting formalde-]] should read -- group consisting of formalde- --

Col. 12, claim 15, line 47 [[consisting formaldehyde]] should read -- consisting of formaldehyde --

Signed and Sealed this

First Day of July, 2008

JON W. DUDAS
*Director of the United States Patent and Trademark Office*